UNITED STATES PATENT OFFICE.

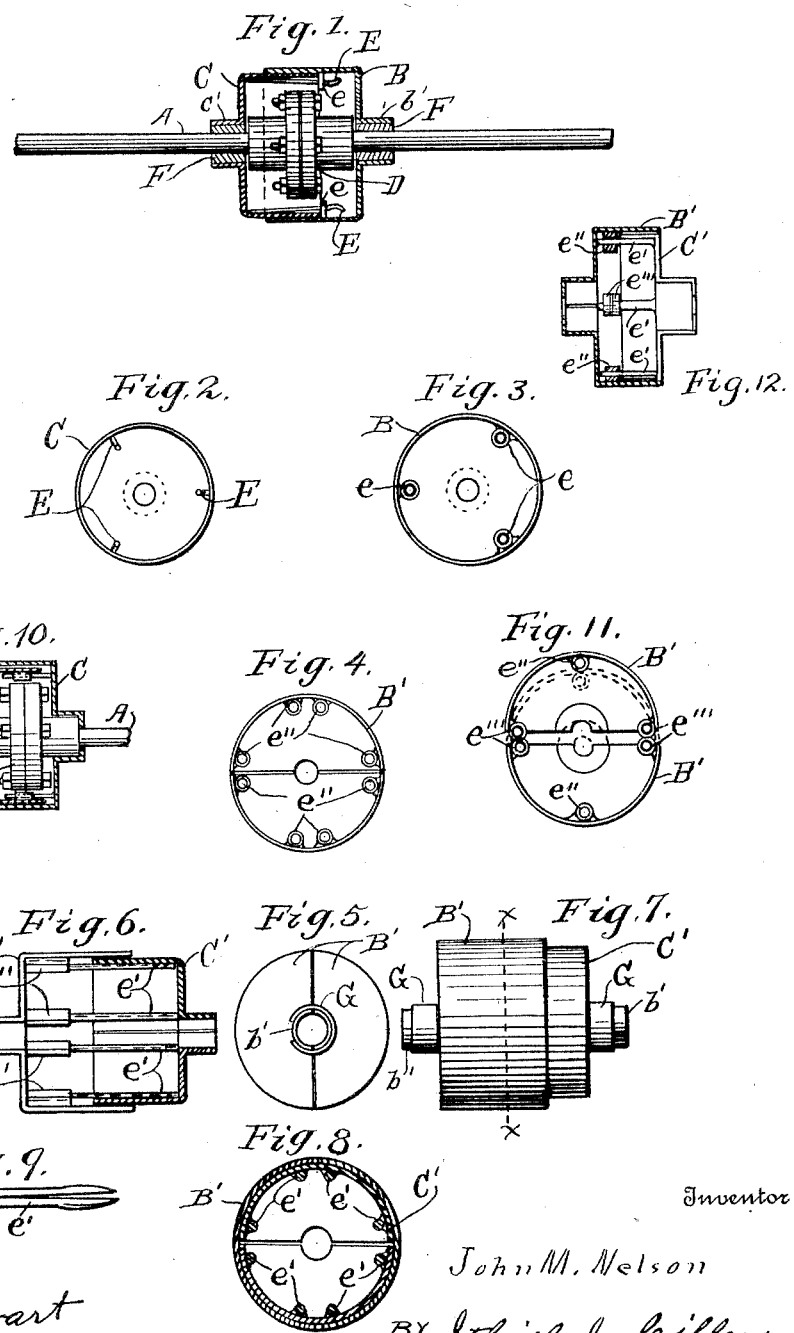

JOHN M. NELSON, OF HIGHLAND PARK, MICHIGAN.

SHAFT-COUPLING GUARD.

1,116,470.     Specification of Letters Patent.     Patented Nov. 10, 1914.

Application filed March 14, 1913. Serial No. 754,366.

*To all whom it may concern:*

Be it known that I, JOHN M. NELSON, a citizen of the United States, residing at 20 Grand avenue east, Highland Park, in the county of Wayne and State of Michigan, have invented certain new and useful Improvements in Shaft-Coupling Guards, of which the following is a specification.

My invention relates to improvements in guards for covering shaft couplings to protect operators and workmen from danger of having their clothing entangled with, or caught upon the securing bolts and endangering the life and limb of the operator. I attain this object by the construction shown in the accompanying drawing, in which—

Figure 1 is an elevation of a shaft and coupling with my guard shown in section thereon. Figs. 2 and 3 are end views of the two cups that make up a complete guard for use in new work where the guards may be applied before the shafting is in place in its hangers. Fig. 4 is a like view of a modified form of guard intended to be used upon shafting that has been in use and is in place in the shaft hangers so that the guard could not be applied if the cups were made in one piece. Fig. 5 is an end elevation of the same showing how the "hub" portion of the guard may be safely secured around the shaft. Fig. 6 is an elevation of one half of the guard shown on the line of division, and the other half shown in section to illustrate how the divided guards are applied to the shafting and couplings. Fig. 7 is an elevation of the same as it appears when properly assembled. Fig. 8 is a section of the same looking to the right from the line *x x* of Fig. 7. Fig. 9 indicates the preferred form of supporting rod or pin with which to safely connect the two cups together. Fig. 10 shows the guard in section and made to assume nearly the form of the coupling. Fig. 11 shows a divided guard with single tie loops, and Fig. 12 is a sectional side view of the same.

Similar letters refer to similar parts throughout the several views.

This guard is designed to be made of sheet metal and when for use upon new shafting before the same has been alined in its supporting boxes or bearings, the guards are made in two parts, B and C, in the form of cups, C being of a proper size to fit freely but closely inside of B so that when assembled the whole will have the appearance of a plain smooth surface over the coupling D of the shaft A. To securely hold these two cups together, when in position over a coupling, I form a number of small loops, as *e* on the inner periphery of the cup B, and secure springs, as E, to the inner periphery of the cups C in positions to engage with, or pass through the loops *e* and spring inward so they cannot be easily withdrawn. This will hold the cups together so they cannot be removed without a considerable effort on the part of the operator, yet may be removed without damage to the parts, when necessary or desirable to do so. As there is a great difference in the diameter of shafts, which would entail great cost in preparing dies for making these guards, if each size of shaft was to be provided for, I place a thin insert or core, as F between the hubs *b'* and *c'* of the guard and the shaft, by which means it is possible to make guards for various sizes of shafts and couplings with but one set of dies.

It will be readily understood that the above described guard could not be applied to a shaft after it has been placed in its bearings, without taking it down and removing the couplings or pulleys that may be mounted thereon, hence it is necessary to provide a guard that may be readily applied to any shaft in any place or position, and for this purpose I make a guard in four pieces, as indicated in Figs. 6 and 8, where each cup, B' and C', is divided into two halves in the manner indicated in Figs. 4, 5, 6 and 8. When applying this guard to a shaft and coupling I place the two halves of one cup, as B', with the dividing edges in one direction, and the halves of the other cup, as C', with the dividing edges at right angles with the dividing edges of the cup B', and to safely secure the two cups together place short tubes, as *e''* securely upon the inner surface of the two halves of the cup B', and corresponding rods, as *e'* on the inner surface of the two halves of the cup C' in position so that the ends of the rods *e'* will enter the tubes *e''* and hold the two cups securely together, each half of one cup holding the two halves of the other cup safely in place, both laterally and longitudinally. I prefer that the rods *e'* be some acute spring metal and be split or bifurcated so they may be made to pass into the corresponding tubes sufficiently close so that it will require considerable force to enter them into, or withdraw them from the tubes to hold the two cups safely together longitudinally, though plain rods may be successfully used.

To provide against the necessity of using bolts upon these guards, in any form, I secure the hubs $b'$ by placing very strong sheet metal springs, as G, upon said hubs in such a manner as to bind them firmly together, as indicated in Figs. 5 and 7.

In lieu of making the divided cups with two loops $e''$ and two rods, $e'$, at each quarter, as indicated in Figs. 4 and 6, I frequently make them so that a single rod will tie them safely together, as indicated in Fig. 11 where the edge loops $e'''$ are so placed that when the two halves of the cup are brought together, as indicated by the dotted lines in Fig. 11, the loops $e'''$ will pass by each other so that a rod may be passed through the two and thus firmly tie the sections of each cup together, as indicated in Fig. 12.

It will be readily understood that this shield may be used to protect protruding collars or any other dangerous attachment that it may be necessary to protect in connection with fast revolving shafting.

What I claim as new, and desire to secure by Letters Patent of the United States, is:

1. In combination with the shaft sections and a coupling therefor, a guard composed of two cups arranged to telescope, loops extending inward from the concave surface of the outer cup, and rods split to form spring catches and secured to the inner cup in position to extend longitudinally through the loops in the outer cup to hold said cups in proper relative position.

2. In combination with the shaft sections and a coupling therefor, a guard composed of two sheet metal cups, each cup divided longitudinally to form two half cups with one of said cups arranged to telescope into the other cup, loops secured to the inner concave surface of one of said cups, rods secured to the inner surface of the other cup and extending longitudinally thereof in position to engage the loops in the other cup and hold said cups in place laterally and longitudinally.

3. In combination with the shaft sections and a coupling therefor, a guard formed of two cups, each of said cups divided longitudinally into halves and having an open hub at the end, said cups made to telescope with the division lines at right angles with each other, loops extending inward from the concave surface of the larger cup, spring metal rods inside of the smaller cup and extending longitudinally thereof with the free ends split and in position to pass through the loops and expand to hold the cups safely in place together laterally and longitudinally, and a spring band to encompass each hub and hold them in place on the shaft, substantially as shown and described.

Signed at Highland Park, Michigan, March 3, 1913.

JOHN M. NELSON.

In presence of—
R. V. NELSON,
TYRRELL H. DUNCOMB.

---

Copies of this patent may be obtained for five cents each, by addressing the "Commissioner of Patents, Washington, D. C."